(12) United States Patent
Williams et al.

(10) Patent No.: US 8,996,476 B2
(45) Date of Patent: Mar. 31, 2015

(54) CORRECTION OF CHECK PROCESSING DEFECTS

(75) Inventors: Geoffrey R. Williams, Midlothian, TX (US); Timmy L. Gauvin, Atlanta, GA (US); Kerry M. Cantley, Fort Mill, SC (US); Deborah N. Bennett, Conyers, GA (US); Eric S. Sandoz, II, Concord, CA (US); James F. Barrett, II, Morristownship, NJ (US); Joshua A. Beaudry, Brooklyn, NY (US)

(73) Assignee: Bank of America Corporation, Charlotte, NC (US)

( * ) Notice: Subject to any disclaimer, the term of this patent is extended or adjusted under 35 U.S.C. 154(b) by 106 days.

(21) Appl. No.: 13/589,886

(22) Filed: Aug. 20, 2012

(65) Prior Publication Data

US 2014/0052697 A1 Feb. 20, 2014

(51) Int. Cl.
*G06F 7/00* (2006.01)
*G06F 17/30* (2006.01)

(52) U.S. Cl.
CPC .................................. *G06F 17/30* (2013.01)
USPC ............. 707/691; 382/139; 382/310; 705/45; 235/379

(58) Field of Classification Search
USPC .................... 707/691; 382/139, 310; 235/379; 705/45
See application file for complete search history.

(56) References Cited

U.S. PATENT DOCUMENTS

| | | | | |
|---|---|---|---|---|
| 4,947,321 A | * | 8/1990 | Spence et al. ................... | 705/45 |
| 5,159,548 A | * | 10/1992 | Caslavka ......................... | 705/45 |
| 5,198,975 A | * | 3/1993 | Baker et al. ...................... | 705/45 |
| 5,594,226 A | | 1/1997 | Steger | |
| 5,963,659 A | * | 10/1999 | Cahill et al. .................. | 382/139 |
| 6,073,121 A | | 6/2000 | Ramzy | |
| 6,129,273 A | * | 10/2000 | Shah .............................. | 235/380 |
| 6,181,837 B1 | * | 1/2001 | Cahill et al. .................. | 382/305 |
| 6,384,844 B1 | * | 5/2002 | Stewart et al. ................ | 715/764 |
| 6,574,377 B1 | * | 6/2003 | Cahill et al. .................. | 382/305 |
| 6,863,214 B2 | * | 3/2005 | Garner et al. ................. | 235/379 |
| 6,959,326 B1 | | 10/2005 | Day et al. | |
| 7,004,382 B2 | | 2/2006 | Sandru | |
| 7,090,131 B2 | * | 8/2006 | Natsuno ........................ | 235/449 |

(Continued)

OTHER PUBLICATIONS

Higgins, R., "Ramifications of MICR Mismatch in Check Image Exchange", All My Papers Publication, Jan. 2008, 16 pages.*

(Continued)

*Primary Examiner* — Phuong Thao Cao
(74) *Attorney, Agent, or Firm* — Weiss & Arons LLP; Michael A. Springs, Esq.

(57) ABSTRACT

Apparatus, methods and media for correcting a defective check processing datum. The apparatus may include, and the methods and media may involve, a receiver that is configured to receive from memory a first transaction record. The transaction record may include Magnetic Ink Character Recognition (MICR) line data. The MICR line data may be electronically read from a check. The transaction record may include non-MICR data. The non-MICR data may be electronically read from the check. The apparatus may include, and the methods and media may involve, a processor that is configured to identify a defective datum among the MICR line data. The processor may identify a portion of the non-MICR data that corresponds to the defective datum. The processor may store in memory a second transaction record. The second transaction record may include corrected data that includes an element that is derived from the identified portion of the non-MICR data.

4 Claims, 6 Drawing Sheets

(56) References Cited

U.S. PATENT DOCUMENTS

| | | | | |
|---|---|---|---|---|
| 7,124,113 | B1* | 10/2006 | Fairclough et al. | 705/50 |
| 7,165,723 | B2* | 1/2007 | McGlamery et al. | 235/449 |
| 7,349,884 | B1* | 3/2008 | Odom et al. | 705/40 |
| RE40,220 | E | 4/2008 | Nichols et al. | |
| 7,379,978 | B2* | 5/2008 | Anderson et al. | 709/219 |
| 7,389,914 | B1 | 6/2008 | Enright et al. | |
| 7,391,934 | B2 | 6/2008 | Goodall et al. | |
| 7,461,775 | B2* | 12/2008 | Swift et al. | 235/379 |
| 7,471,818 | B1 | 12/2008 | Price et al. | |
| 7,606,408 | B2* | 10/2009 | Takiguchi | 382/139 |
| 7,680,317 | B2* | 3/2010 | Adelberg et al. | 382/139 |
| 7,680,318 | B2* | 3/2010 | Agrawal et al. | 382/139 |
| 7,689,025 | B2* | 3/2010 | Takiguchi | 382/139 |
| 7,752,286 | B2* | 7/2010 | Anderson et al. | 709/219 |
| 7,757,938 | B2* | 7/2010 | Richardson et al. | 235/379 |
| 7,856,403 | B2 | 12/2010 | Venturo et al. | |
| 7,962,412 | B2 | 6/2011 | Omura et al. | |
| 8,045,818 | B2 | 10/2011 | Sato et al. | |
| 8,052,040 | B2 | 11/2011 | Stover | |
| 8,121,950 | B2 | 2/2012 | Hassanein et al. | |
| 8,162,125 | B1* | 4/2012 | Csulits et al. | 194/206 |
| 8,467,591 | B1* | 6/2013 | Csulits et al. | 382/135 |
| 2002/0067827 | A1 | 6/2002 | Kargman | |
| 2002/0067846 | A1* | 6/2002 | Foley | 382/139 |
| 2004/0076320 | A1* | 4/2004 | Downs, Jr. | 382/139 |
| 2004/0133516 | A1* | 7/2004 | Buchanan et al. | 705/42 |
| 2004/0217170 | A1* | 11/2004 | Takiguchi et al. | 235/449 |
| 2005/0139670 | A1* | 6/2005 | McGlamery et al. | 235/449 |
| 2005/0139671 | A1* | 6/2005 | McGlamery et al. | 235/449 |
| 2005/0144131 | A1 | 6/2005 | Aziz | |
| 2005/0144189 | A1* | 6/2005 | Edwards et al. | 707/102 |
| 2005/0281449 | A1* | 12/2005 | Takiguchi | 382/139 |
| 2005/0281450 | A1* | 12/2005 | Richardson | 382/139 |
| 2006/0088199 | A1* | 4/2006 | Shizuka et al. | 382/137 |
| 2006/0124727 | A1 | 6/2006 | Kotovich et al. | |
| 2006/0144937 | A1* | 7/2006 | Heilper et al. | 235/383 |
| 2006/0184441 | A1* | 8/2006 | Haschka et al. | 705/35 |
| 2006/0186194 | A1* | 8/2006 | Richardson et al. | 235/379 |
| 2006/0191998 | A1* | 8/2006 | Mueller et al. | 235/379 |
| 2006/0219773 | A1* | 10/2006 | Richardson | 235/379 |
| 2006/0242062 | A1 | 10/2006 | Peterson et al. | |
| 2007/0022053 | A1 | 1/2007 | Waserstein et al. | |
| 2007/0064991 | A1* | 3/2007 | Douglas et al. | 382/137 |
| 2007/0172109 | A1* | 7/2007 | Agrawal et al. | 382/139 |
| 2007/0215691 | A1* | 9/2007 | Swift et al. | 235/379 |
| 2007/0217669 | A1* | 9/2007 | Swift et al. | 382/139 |
| 2007/0267477 | A1* | 11/2007 | Schott et al. | 235/379 |
| 2007/0288382 | A1* | 12/2007 | Narayanan et al. | 705/45 |
| 2008/0135610 | A1* | 6/2008 | Roh | 235/379 |
| 2008/0137939 | A1* | 6/2008 | Wang et al. | 382/139 |
| 2008/0140552 | A1 | 6/2008 | Blaikie | |
| 2008/0279455 | A1* | 11/2008 | Wall | 382/187 |
| 2009/0018960 | A1 | 1/2009 | Gawne | |
| 2009/0037339 | A1 | 2/2009 | Ancell et al. | |
| 2009/0114715 | A1* | 5/2009 | Mueller et al. | 235/379 |
| 2009/0164372 | A1 | 6/2009 | Dell et al. | |
| 2009/0236413 | A1* | 9/2009 | Mueller et al. | 235/379 |
| 2011/0206266 | A1* | 8/2011 | Faulkner et al. | 382/139 |
| 2011/0251956 | A1* | 10/2011 | Cantley et al. | 705/43 |
| 2011/0264572 | A1 | 10/2011 | Cucinotta | |
| 2011/0280450 | A1* | 11/2011 | Nepomniachtchi et al. | 382/112 |
| 2012/0189186 | A1* | 7/2012 | Csulits et al. | 382/135 |
| 2013/0056531 | A1* | 3/2013 | Sato et al. | 235/375 |
| 2013/0243303 | A1* | 9/2013 | Imae et al. | 382/140 |
| 2013/0287284 | A1* | 10/2013 | Nepomniachtchi et al. | 382/139 |

OTHER PUBLICATIONS

Malchar, R., "The Value of MICR for the Remote Check Depositor", Panini Advanced Solutions for Document Processing, 2008, 24 pages.*

Higgins, R., "Small Check Scanner MICR Read Performance Benchmark Study", Feb. 27, 2006, 7 pages.*

"Instant verification of check quality and usability," Parascript, LLC, Longmont, Colorado, retrieved from the World Wide Web on Jul. 17, 2012, 2 pages.

"Check 21: Harnessing a Billion Points of Light," Mercator Advisory Group, May 24, 2004, Maynard, Massachusetts, 3 pages.

"Check Encoders," Starex Financial Systems—Banking Equipment. com, Northridge, California, retrieved from the World Wide Web on Jul. 17, 2012, 3 pages.

"Let's face it—it's hard to keep up," Silver Bullet Technology, Inc., Pensacola, Florida, retrieved from the World Wide Web on Jul. 17, 2012, 2 pages.

Klein, Bob, et al., "Image Quality and Usability Assurance: Phase 1 Project," The Financial Services Technology Consortium (Available from BITS—The Financial Services Roundtable, Washington, D.C.), Aug. 23, 2004, 68 pages.

"Electronic check processing solutions: Choosing the right option for retail payments," First Data, 2008, Atlanta, Georgia, 16 pages.

"Reduce exception item processing costs: New technology paves the way to new saving," Cummins Allison Corporation, Mt. Prospect, Illinois, retrieved from the World Wide Web on Jul. 16, 2012, 6 pages.

"Check 21 and Image Security," The Standard Register Company, Dec. 8, 2003, Wayne, New Jersey, 9 pages.

"X9LIB Software Development Toolkit," All My Papers, Aug. 8, 2012, Saratoga, California, 3 pages.

"MICR V Encoder M-570D," Progressive Business Systems, Inc., 2011, Auburn, Georgia, 2 pages.

"Correcting the Codeline (MICR line)," Financial Management Service—A Bureau of the United States Department of the Treasury, Washington, D.C, retrieved from the World Wide Web on Jul. 18, 2012, 4 pages.

"Vision IP:Check21—Delivering an end-to-end, image-enabled electronic payments environment," Metavante Corporation, 2008, Milwaukee, Wisconsin. 5 pages.

\* cited by examiner

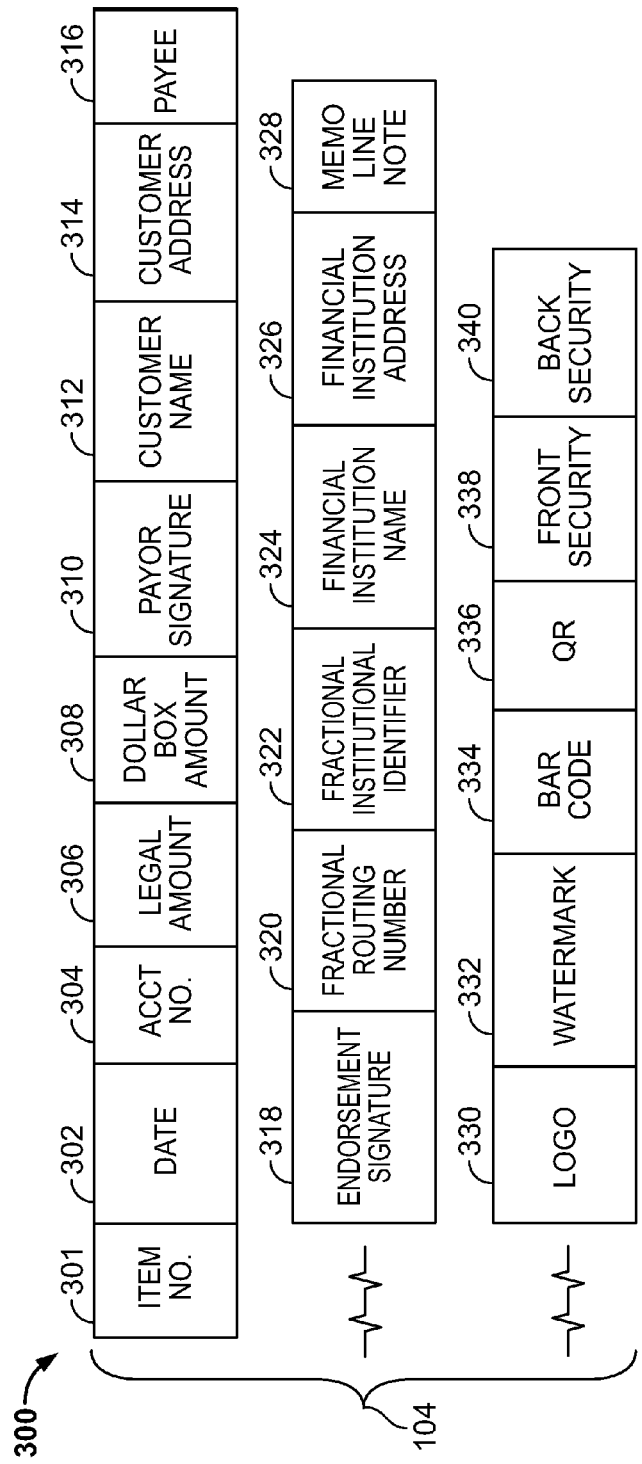
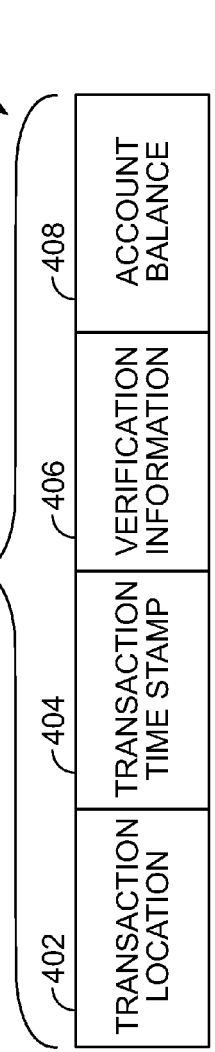
FIG. 3
FIG. 4

CORRECTION OF CHECK PROCESSING DEFECTS

FIELD OF TECHNOLOGY

This disclosure relates to systems and methods for processing information scanned from a negotiable instrument. More specifically, the disclosure relates to systems and methods for correction of check processing defects.

BACKGROUND OF THE INVENTION

Processing of a check issued by a financial institution may involve reading Magnetic Ink Character Recognition (hereinafter, "MICR") line data that may be printed in a MICR line on a face of the check.

MICR line data may include information relevant to the processing of the check and/or of a scanned image of the check. MICR line data may include a routing transit number (hereinafter, in the alternative, "RTN"). The RTN may include a Federal Reserve routing number and an American Bankers Association (hereinafter, "ABA") identifier of the financial institution. The MICR line data may also include an identifying number of an account against which the check may be drafted, an amount of currency for which the check may be written, and an identifying item number of the check itself.

MICR line data may be read by an electronic device. The electronic reading device may be sensitive to magnetic properties of magnetic ink used to print MICR line data on the face of the check.

An electronic device may be used to produce an optically scanned image of the MICR line. The electronic device may be used to produce the scanned image of the check. The scanned image of the MICR line may be part of the scanned image of the check.

Processing of the check may be hindered by defective MICR line data on the check, in the reading of the MICR line data and/or in the scanned image of the MICR line. A defect may originate as a missing element of the MICR line data, e.g., from a tear, fold or crease in the material, generally paper, of the check. The defect may originate as a low quality element of the MICR line data, e.g., improper, stained, smudged and/or covered printing. The defect may originate as an improper reading of the check or the MICR line data, e.g., via a glitch in an electronic reading/scanning device and/or in a check transport device that may deliver the check to the electronic reading/scanning device. The defect may originate from any other source of processing-hindering defect in the MICR line on the check and/or in the MICR line data. The defect may render the check an "exception" to normal check processing: the check may be subject to "exception and defect" processing.

Exception and defect processing may include processing a check featuring a defect. Exception and defect processing may include processing a check featuring a defect in the MICR line on the check and/or in the MICR line data. Exception and defect processing may include correction of defective MICR line data. Correction of defective MICR line data may be required for return of the check to normal check processing. However, correction of defective MICR line data typically involves human intervention.

Correction of defective MICR line data by human intervention may involve human assessment of the MICR line on the check and/or in the scanned image. Correction of defective MICR line data by human intervention may involve human replacement of the defective MICR line data. Human intervention may be slow and inefficient.

It would be desirable, therefore, to provide apparatus, methods and media for correction of defective MICR line data without recourse to human assessment or human replacement of the MICR line data.

SUMMARY OF THE DISCLOSURE

Apparatus, methods and computer readable media are provided for correction of defective MICR line data without recourse to human assessment or human replacement of the MICR line data. The apparatus may include, and the methods and media may involve, a receiver device and a processor device that are configured to capture, enhance and distribute information electronically read from a check. Captured information may comprise data.

Data Capture

Apparatus, methods and media of the disclosure may provide for capture of diverse data from a magnetic read and/or a scanned image obtained at a point of scanning of a check-face (preferably check-front and check-back). Point of check scanning (hereinafter, "POCS") may include a point-of-sale during a transaction at a merchant facility. POCS may include a point of transaction at, and/or access to, a facility of a financial institution (hereinafter, in the alternative, "FI"), such as an on-line banking portal, Automatic Teller Machine (hereinafter, "ATM") or FI associate. The associate may be accessed via video/virtual and/or live presence of the associate. POCS may include a point of processing of the check on behalf of the financial institution. POCS may include a point of transaction and/or point of processing at a non-FI facility.

The data captured may comprise a check meta-data set. Check meta-data may represent information electronically read from the check. The check meta-data set may comprise data representing some or all of the information electronically read from the check.

The check meta-data set may be stored in a transaction record. A subset of the meta-data may be stored in a transaction record. A transaction record may comprise one or more segments. A segment may contain no data, one datum or more than one datum. A segment may contain the meta-data set. A segment may contain a subset of the meta-data. Data-contents of a segment may represent information captured from an area of the check. Data-contents of a segment may correspond to information from an area of the check. A segment may represent information represented by data-contents of the segment. A segment may represent information captured from an area of the check. A segment may correspond to information from an area of the check.

Two or more segments may have a correspondence. The correspondence may be an informational correspondence. The correspondence may be a correspondence of the data-contents of two or more segments. The data-contents of corresponding segments may represent corresponding information.

A segment that represents information captured from an area of the check may correspond to another segment that represents information captured from an area of the check. A segment representing information captured from a magnetic read of an area of the check may correspond to a segment representing information captured from a scanned image of an area of the check. For example, a segment representing a RTN captured from a magnetic read of the MICR line of the check, may correspond to a segment representing the RTN captured from a scanned image of the MICR line of the check. The scanned image of the MICR line of the check may be part of a scanned image of an area of the check that includes at least part of the MICR line of the check.

A segment that represents information captured from a first area of the check may correspond to another segment that represents information captured from a second area of the check. A segment representing information captured from a scanned image of a first area of the check may correspond to a segment representing information captured from a scanned image of a second area of the check. The second area of the check may be distinct from the first area of the check. For example, a segment representing a RTN captured from a scanned image of the MICR line of the check, may correspond to a segment representing a RTN captured from a scanned image of an area of the check that may be distinct from the MICR line.

A subset of the meta-data may comprise MICR line data. One or more segments of the transaction record may contain MICR line data. One or more segments of the transaction record may contain defective MICR line data. A segment of the transaction record may contain a defective MICR line datum.

Data Enhancement

Apparatus, methods and media of the disclosure may provide for enhancement of the check meta-data set. Enhancement of the check meta-data set may include augmentation of captured check meta-data with data that may not be available in the magnetic read and/or scanned image of the check. Augmenting data may be stored in one or more segments of the transaction record.

Augmenting data may include data received by the receiver from a POCS. Such augmenting data may include a POCS identifier, a POCS-site security assessment, and/or a transaction time stamp. Augmenting data may include magnetically read MICR line data.

Augmenting data may include data received by the receiver from a FI database containing information associated with an account against which the check may be written. Such augmenting data may include a decryption key for encrypted accountholder identity verification data that may be included on the check. Such augmenting data may include accountholder identity verification data, an account balance and/or a measure of the account's overdraft status. Augmenting data may include data received by the receiver from a database containing information associated with a payee.

Augmenting data may include data derived through processing by the processor of meta-data captured from the magnetic read and/or the scanned image of the check. Such augmenting data may include: an ABA identifier of the FI captured from an area of the check face other than the MICR line; an account number read from a barcode on the check-face; and a machine-readable alphanumerical representation of a signature of a payor handwritten on the check. Augmenting data may include a corrected datum to replace a defective datum. Augmenting data may include corrected MICR line data to replace defective MICR line data.

The transaction record that may contain check meta-data that may include a defective datum may be a first transaction record. Augmenting data may be stored in a second transaction record. The data stored in the second transaction record may be identical to the data stored in the first transaction record. The data stored in the second transaction record may be identical to the data stored in the first transaction record except for a replacement of defective MICR line data by corrected MICR line data. The second transaction record may contain a corrected check meta-data set. The second transaction record may contain a corrected check meta-data subset. The second transaction record may contain the corrected MICR line data. The second transaction record may contain only the corrected MICR line data. The second transaction record may contain a replacement for the defective datum. The second transaction record may contain only a replacement for the defective datum. The second transaction record may comprise segments. Segments of the second transaction record may be appended to the first transaction record.

Data Distribution

Apparatus, methods and media of the disclosure may provide for distribution of one or more transaction records containing subsets of captured check meta-data and/or of enhanced check meta-data. Distribution of the transaction record(s) may facilitate FI purposes and/or activities that may be served by access to some or all of the meta-data of the check meta-data set. FI purposes and/or activities that may be served by access to some or all of the meta-data may include: customer account management, marketing analytics, targeted advertising, and check processing.

Check processing that may be facilitated by distribution of transaction record(s) may include: verification, at a point-of-sale, of a check-writer's identity as a customer of the FI (viz., as a holder of the account against which the check may be written) and/or of account balance sufficiency to cover an amount of the check; and check exception and defect processing.

Check exception and defect processing that may be facilitated by distribution of one or more meta-data subsets may include correction of check defects. Check defects that may be corrected may include MICR line data defects. Correction of defective MICR line data may obviate or reduce a need for the check to be subject to "exception and defect" processing: the corrected check may be subject to normal check processing.

Apparatus, methods and media that may provide for capture, enhancement and distribution of check meta-data may include components and/or functions that reside in facilities, locations and devices associated with the FI, a merchant and/or the customer. Several examples of components and/or functions of the invention in such facilities, locations and devices, may include: an ATM configured to initiate the capture of at least part of the check meta-data set; a merchant facility device-enabled to utilize a distributed meta-data subset transaction record for point-of-sale initiated debiting of the amount of the check from the check-writer's FI account; an on-line banking portal, accessed through an application-enabled mobile device of the customer, to provide an image of the check for deposit as part of an augmented meta-data set transaction record; and a customer smartphone application-enabled to provide an encrypted customer-identity authentication code to be accepted by the merchant's device-enabled facility.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIGS. 1-4 show illustrative information in accordance with the principles of the invention;

DETAILED DESCRIPTION OF THE DISCLOSURE

Figures 1, 2:
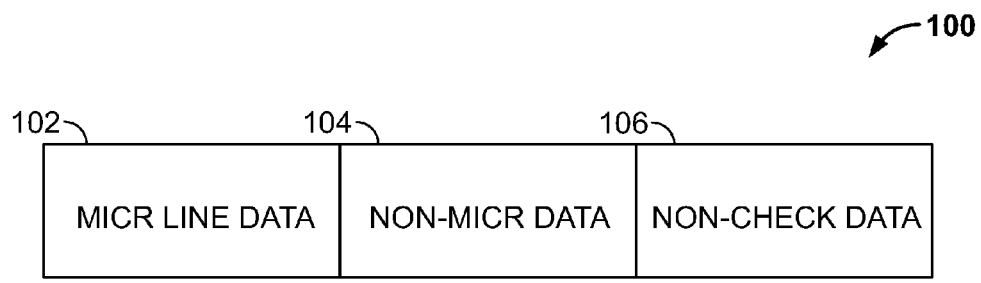

Apparatus, methods and media are provided for correcting a defective check processing datum. The apparatus may include, and the methods and media may involve, a receiver device that is configured to receive from memory a first transaction record.

The transaction record may include MICR line data. The MICR line data may be electronically read from a check. The transaction record may include non-MICR data. The non-MICR data may be electronically read from the check.

Electronic reading of the check may include magnetic reading of the check, optical scanning of the check and/or any other suitable electronic reading of the check. Other suitable electronic reading of the check may include electronic reading of Braille embossing on the check.

The apparatus may include, and the methods and media may involve, a processor device that is configured to store in memory an electronic reading of the check. The electronic reading of the check may contain representations of features of the check. The processor may store in memory the magnetic read and/or scanned image of the check. The magnetic read and/or scanned image of the check may contain representations of features of the check.

Table 1 lists examples of generalized types of features of the check that may be represented in the electronic reading of the check.

TABLE 1

Examples of generalized check features.

MICR line features
Non-MICR line features
   Barcodes
   Graphic illustration
   Handwriting
   Print
   Quick Response ("QR") Codes
   Security features The processor may be configured to produce an electronic representation of check features from the electronic reading of the check; the representation may represent the check. The processor may produce an electronic representation of the check from the scanned image of the check; the representation may represent the check. The processor may produce an electronic representation of the MICR line data from the magnetic read of the MICR line; the representation may represent the MICR line data. The processor may produce an electronic representation of the MICR line data from the scanned image of the MICR line; the representation may represent the MICR line data. The representation(s) of the MICR line may be part(s) of the representation(s) of the check.

The representation(s) of the MICR line data and/or of the check may be stored in one or more transaction records. The check meta-data set may be stored in one or more transaction records. A subset of the check meta-data set may be stored in one or more transaction records. A stored check meta-data subset may be part of the electronic representation of the check.

The processor may be configured to identify features of the check represented in the magnetic read and/or scanned image of the check. The processor may analyze features of the check represented in the magnetic read and/or scanned image of the check. Outcomes of identification and/or analysis of the represented features may be stored as data in segments of the transaction record. Unanalyzed/unidentified features of the check may be stored as data in segments of the transaction record. Data-contents of a segment of the transaction record may represent information associated with a feature of an area of the check.

Table 2 lists examples of illustrative data-contents of segments of the transaction record.

TABLE 2

Illustrative transaction record segment data-contents.

MICR data
   MICR-string-identifying symbols
   MICR RTN
      MICR routing number
      MICR institutional identifier
   MICR account number
   MICR currency amount
   MICR check number
Non-MICR data
   fractional RTN
      fractional routing number
      fractional institutional identifier
   barcoded account number
   currency amount
   check number
   transaction date
   financial institution name
   financial institution address
   payor signature
   payor name
   payor address
   payee designation
   endorsement signature
   memo line note
   logo
   encrypted verification information A payee may be a customer of the FI. A payor may be a customer of the FI. The payee and the payor may be customers of the FI. The FI may store in an archive information regarding customers, the customers' account information, the customers' communications with the FI, the customers' spending behavior and any other suitable information.

The archive information may include database-stored verification information. The verification information may relate to authentication of a customer identity. The verification information may include a Personal Identification Number (hereinafter, "PIN"), a fingerprint, a voiceprint, an iris scan or any other suitable verification information.

The FI may include one or more items of verification information on the check-face. The verification information may be encrypted.

The transaction record may be based on a transaction. The transaction may take place between the customer and the FI, between the customer and a FI of which the customer is not a customer, a first customer and a second customer, a customer and a merchant, a first merchant and a second merchant or between any other suitable parties. The transaction record may be generated by a transaction device such as a POCS device, a customer communication device such as a computer, a tablet, a cell-phone or the like, or any other suitable device. The transaction record may be generated by a check processing device. Formatting and/or data-contents of the transaction record may not be dependent on a nature of the transaction and/or on a device generating the transaction record. Formatting and/or data-contents of the transaction record may be dependent on the nature of the transaction and/or on the device generating the transaction record.

A segment of the transaction record may contain data corresponding to a defective datum among the MICR line data. The defective datum may be an extraneous datum. The defective datum may be a missing datum. The extraneous datum may be an obscured datum. The defective datum may be a damaged datum. The defective datum may be a datum in a string that has a defective MICR-string-identifying symbol. The defective datum may be a datum among MICR line data of a MICR line previously identified as defective.

The processor may be configured to identify the defective datum among the MICR line data. MICR data characters and symbols may be known. Standards by which MICR characters and/or MICR strings are printed may be known. The defective datum may be identified by comparison with known MICR characters, symbols and/or printing standards. The defective datum may be identified as being an extraneous symbol. A string of MICR characters may lack a standard number of characters. A MICR-string-identifying symbol may be missing.

After identifying the defective datum, the processor may identify a string in which the defective datum may be present. The string may a portion of the MICR line data. The string may be a MICR string. The processor may identify the string based on a MICR-string-identifying symbol. The processor may identify the string by counting the number of MICR characters relative to the MICR-string-identifying symbol. The processor may identify the string by counting the number of MICR characters relative to a beginning and/or an end of the MICR string.

The processor may be configured to correct the defective datum. The processor may correct the defective datum by using data captured in the electronic reading of the check. The processor may correct the defective datum by using data obtained in magnetic reading of the check, in optical scanning of the check and/or in any other suitable electronic reading of the check. The processor may correct the defective datum by using non-MICR data. The non-MICR data may be obtained by electronically optically scanning the check. The processor may correct the defective datum by using MICR data. The MICR data may be obtained by electronically magnetically reading the check.

Correction Using Non-MICR Data

The processor may be configured to identify a portion of the non-MICR data that corresponds to the defective datum. The processor may use a look-up table of correspondences between MICR line data and non-MICR data.

Correspondence of a MICR line datum and a non-MICR datum may be through the data representing MICR line check-face information and non-MICR check-face-information that are functionally equivalent. For example, the look-up table may feature a correspondence between MICR line data representing an account number printed on the MICR line and between non-MICR data representing the account number printed on the check in an area distinct from the MICR line.

Correspondence of a MICR line datum and a non-MICR datum may be through the data representing MICR line check-face information and non-MICR check-face-information that may be processed to yield functional equivalents. For example, the look-up table may feature a correspondence between MICR line data representing an account number printed on the MICR line and between non-MICR data representing a barcode that may be processed to yield the account number.

The processor may use the look-up table to identify the portion of the non-MICR data that corresponds to the defective datum's MICR string.

The processor may derive an element from the portion of the non-MICR data. The processor may identify an element in the portion of the non-MICR data. The derived and/or identified element may be a non-MICR data value that corresponds to the defective datum. The processor may replace the defective datum with the non-MICR data value. The processor may replace the defective datum by replacing the defective datum in the first transaction record with the non-MICR data value.

The processor may be configured to store in memory a second transaction record. The second transaction record may include the element that is identified in, and/or derived from, the portion of the non-MICR data. The processor may replace the defective datum by storing the non-MICR data value. The processor may replace the defective datum by storing the non-MICR data value in the second transaction record.

The processor may be configured to store corrected MICR line data. The processor may be configured to store corrected MICR line data in the second transaction record. The corrected MICR line data may be identical to the MICR line data of the first transaction record. The corrected MICR line data may not be identical to the MICR line data of the first transaction record. The corrected MICR line data may include the element identified in, and/or derived from, the portion of the non-MICR data. The element may be the non-MICR data value derived and/or identified in the portion of the non-MICR data. The element may be a replacement for the defective datum.

The look-up table may feature a correspondence of MICR line check-face information and non-MICR check-face-information through correspondence of two or more transaction record segments representing the information. The processor may be configured to identify in the first transaction record a MICR line data segment that corresponds to the defective datum. The MICR line data segment may contain the defective datum. Based on the MICR line data segment, the processor may use the look-up table to identify in the first transaction record a non-MICR data segment. The processor may identify, within the non-MICR data segment, the portion of the non-MICR data that corresponds to the defective datum's MICR string.

For example, the MICR line segment identified in the first transaction record as corresponding to the defective datum, may represent the RTN printed in the MICR line on the check. The defective datum may be part or all of the MICR line RTN data.

On the basis of the identification of the MICR line segment, the processor may use the look-up table to identify another segment of the first transaction record. The other segment of the first transaction record may be a segment of non-MICR data that represents a fractional RTN printed on the check. Fractional RTNs, generally printed in an area of the check distinct from the MICR line, may contain much of the information of MICR RTNs. However, fractional RTN information is typically presented in a format different from that of MICR RTN information. Data of MICR RTNs may be at least partly derived from data of fractional RTNs. A portion of MICR line RTN data may be derived from a corresponding portion of fractional RTN data.

Within the fractional RTN data segment, the processor may identify a portion corresponding to the defective datum in the MICR line data. For example, if the defective datum in the MICR line data is part or all of the Federal Reserve routing number, the processor may identify a portion within the fractional RTN data segment corresponding to the fractional Federal Reserve routing number. The processor may identify and/or derive from the fractional Federal Reserve routing number, an element that may represent the defective datum in the MICR line Federal Reserve routing number. If, for example, the defective datum represents a third digit of the MICR line Federal Reserve routing number, the processor may identify a third digit of the fractional Federal Reserve routing number. The processor may store the third digit of the fractional Federal Reserve routing number. The processor may store the third digit of the fractional Federal Reserve routing number in the second transaction record. The data of the second transaction record may be identical to the data of the first transaction record except for the defective third digit of the MICR line Federal Reserve routing number being replaced by the third digit of the fractional Federal Reserve routing number. The processor may replace the defective MICR line Federal Reserve routing number with the fractional Federal Reserve routing number.

As another example, the MICR line segment identified as corresponding to the defective datum may represent an ABA institutional identifier. The non-MICR data segment identified by the processor through the look-up table may represent a fractional ABA institutional identifier that the processor may use to derive the ABA institutional identifier. Alternatively or additionally, the identified non-MICR data segment may represent a name printed on the check of a FI maintaining the account against which the check may be drafted, viz., a name of a payor FI. On the basis of the payor FI name, the processor may identify the ABA institutional identifier. The processor may be configured to access an ABA database and/or a FI database to identify the ABA institutional identifier on the basis of the payor FI name. The processor may use the ABA institutional identifier derived and/or identified from the non-MICR data to replace the defective datum.

As another example, the MICR line segment identified as corresponding to the defective datum may represent an account number. The non-MICR data segment identified by the processor as corresponding to the identified MICR line segment may represent an account number derived from a barcode printed on the check. Alternatively or additionally, the non-MICR data segment may represent an accountholder name printed on the check. On the basis of the accountholder name, the processor may identify the account number. The processor may be configured to access a FI database to identify the account number on the basis of the accountholder name. Alternatively or additionally, the non-MICR data segment may represent an accountholder signature on the check. On the basis of the accountholder signature, the processor may identify the account number. The processor may be configured to perform handwriting analysis to analyze the accountholder signature. The processor may be configured to access a FI database to identify the account number on the basis of the accountholder signature. The processor may use the derived and/or identified account number to replace the defective datum.

Correction Using MICR Data

The processor may be configured to identify a portion of magnetically read MICR line data that corresponds to the defective datum. The first transaction record may contain segments representing MICR line information in the scanned image of the MICR line. The first transaction record may contain segments representing MICR line information in the magnetic read of the MICR line. Segments representing data from the scanned image may correspond to segments representing data from the magnetic read. Correspondence may be through self-identity of a given MICR line string printed on the check that may be read magnetically and may be scanned optically. The correspondence may be a feature of a look-up table of correspondence between optically scanned MICR line data and magnetically read MICR line data. For example, a transaction record segment that represents a MICR ABA institutional identifier from the scanned image of the MICR line printed on the check may correspond to another segment that represents a MICR ABA institutional identifier from the magnetic read of the MICR line printed on the check.

For example, the processor may identify a defective datum among the MICR line data representing the MICR ABA institutional identifier from the scanned image. The defective datum may be defective due to a stain that obscures part of the ABA institutional identifier printed in the MICR line on the check. The defective datum may be defective due to a glitch in optical scanning. The defective datum may be defective due to a defect-producing cause that may not involve or may not affect the magnetic ink of the MICR line printed on the check.

The processor may identify the segment of the transaction record containing the defective datum as the segment representing the MICR ABA institutional identifier from the scanned image. The processor may use the look-up table to identify the corresponding segment of the transaction record representing the MICR ABA institutional identifier from the magnetic read. The processor may analyze the magnetically obtained data. The processor may identify in the magnetically obtained data a datum corresponding to the defective datum. The processor may analyze the magnetically obtained datum. The magnetically obtained datum may be free of the defect identified in the defective data. The processor may use the magnetically obtained MICR ABA institutional identifier to replace the defective optically scanned MICR ABA institutional identifier.

For example, if the defective datum may represent a second digit of the MICR ABA institutional identifier from the scanned image, the processor may identify a second digit of the MICR line ABA institutional identifier from the magnetic read. The processor may analyze the second digit of the MICR ABA institutional identifier from the magnetic read. The second digit of the MICR ABA institutional identifier from the magnetic read may be free of the defect identified in the defective data. The processor may use the magnetically obtained datum to replace the defective datum. The magnetically obtained datum may be stored in the second transaction record. The magnetically obtained MICR ABA institutional identifier may be stored in the second transaction record.

The above examples may be illustrative of defective MICR line data being replaced by replacement data derived and/or identified from electronically optically obtained non-MICR data, electronically magnetically obtained MICR line data and/or any other suitable form of check-face data. The replacement data may correspond to the defective data and may be free of the defective data's defect. The processor may be configured to store the replacement data in one or more segments of the second transaction record. The processor may store corrected MICR line data in the second transaction record. The processor may store non-MICR data in the second transaction record. The processor may store magnetically read MICR data in the second transaction record. The processor may store augmenting data in the second transaction record. Augmenting data may enhance check meta-data captured from the check. Enhanced check meta-data may contain corrected check meta-data.

Transaction record data may be distributed by the FI. Enhanced check meta-data may be distributed by the FI. Corrected check meta-data may be distributed by the FI.

Apparatus, methods and media of the disclosure may provide a system-architecture for expediting the distribution of transaction record data. The FI may utilize the system-architecture to distribute the transaction record(s) or segments of the transaction record(s). The FI may distribute some or all segments of the transaction record(s) within the FI to provide information to facilities and/or for activities of the FI. Some or all segments of the transaction record(s) may be requested by facilities and/or for activities of the FI. Distribution and/or request of some or all segments of the transaction record(s) may utilize information contained in some or all segments of the transaction record(s). Some or all segments of the transaction record may be distributed to and/or requested by FI facilities and/or activities that may utilize information contained in some or all segments of the transaction record(s).

Distribution and/or request of some or all segments of the transaction record(s) may be facilitated by formatting, sorting and/or indexing of the transaction record. Some or all segments of the transaction record may be distributed and/or requested with differing formatting, sorting and/or indexing.

The processor may be configured to format the transaction record(s). The processor may sort the transaction record(s). The processor may index the transaction record(s). The processor may index the transaction record(s) by a check feature, by data-contents of a transaction record segment or by any other suitable attribute of the check or of the transaction record. In this way, a plurality of transaction records can be sorted by one or more of the indexed features.

The processor may be configured to register the transaction record(s) to the scanned image of the check. The processor may register segments of the transaction record(s) to the scanned image of the check. Some or all of the scanned image of the check may be stored in one or more segments of the transaction record(s). Registration of the transaction record(s) to the scanned image of the check may be stored in one or more segments of the transaction record(s). Distribution of segments of transaction record(s) containing subsets of check meta-data and/or of enhanced check meta-data may be more efficient than distribution of the scanned image of the check.

The scanned image of the check may be stored in an archive. The scanned image of the check stored in the archive may be registered to the transaction record(s). The archived scanned image of the check may be available for distribution. The archived scanned image of the check may be available for production of a transaction record that contains check meta-data. The archived scanned image of the check may be available for analysis. The archived scanned image of the check may be available for analysis by components and functions of the invention.

Examples of FI activities that may utilize information contained in some or all segments of the transaction record(s) may include: preparation of customer transaction records; tracking check-validity as a function of method of customer-identification verification; point-of-sale verification of accountholder identity and/or of account balance sufficiency; and check processing.

Illustrative point-of-sale verification of an accountholder's identity and of account balance sufficiency that may be facilitated by distribution of transaction record(s) may include use of the check as a debit instrument. A point-of-sale POCS device of the merchant may provide to the merchant components and functions to confirm the identity of the customer. The point-of-sale POCS device may provide to the merchant components and functions to confirm a sufficiency of funds in the customer's account. The point-of-sale POCS device may provide to the merchant components and functions to debit the customer's account.

The customer may input confirmatory verification information via the point-of-sale device. A customer communication device may include a mobile device application. The mobile device application may provide for input of the confirmatory verification by the payor to the merchant's point-of-sale POCS device via the customer communication device.

The input confirmatory verification information may include a PIN, a fingerprint, a voiceprint, an iris scan or any other suitable verification information. The processor may compare the input with verification information stored in a FI database and/or in one or more segments of the transaction record.

The processor may compare the currency amount for which the check may be written with account balance information stored in a FI database and/or in one or more segments of the transaction record.

Given verification of the customer's identity as the accountholder and of sufficiency of the account balance, the processor may initiate transfer of the currency amount of the check from the authenticated accountholder's FI account to an account of the merchant.

Illustrative check processing activities that may be served by receiving information contained in some or all segments of the transaction record may include: routing of scanned images of checks to processing centers and/or clearing houses; and correction of check processing defects.

Illustrative embodiments of apparatus and methods of correction of check processing defects in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows transaction record 100. Transaction record 100 may correspond to the transaction. Transaction record 100 may be based on the transaction. Transaction record 100 may include one or more segments such as MICR line data 102, non-MICR data 104 and non-check data 106.

Both MICR line data 102 and non-MICR data 104 may correspond to features of the check and/or of a scanned image of the check. MICR line data 102 may correspond to MICR line information printed on the check. Non-MICR data 104 may correspond to features of the check other than the MICR line printed on the check. Non-MICR data 104 may correspond to outcomes of analyses of non-MICR features of the check. Non-MICR data 104 may correspond to data derived from non-MICR features of the check. Non-check data 106 may correspond to information that may not be on the check. Non-check data 106 may correspond to information that may not be derived from information on the check. Non-check data 106 may correspond to augmenting data received from the POCS and/or from FIs.

FIGS. 2, 3 and 4 show illustrative data-contents of MICR line data 102, non-MICR data 104 and non-check data 106.

FIG. 2 shows illustrative transaction record 200. Transaction record 200 may include data-contents of MICR line data 102 (also shown in FIG. 1). Transaction record 200 may include one or more segments, such as symbol 202a, magnetic symbol 202b, routing number 204a, magnetic routing number 204b, ABA institutional identifier 206a, magnetic ABA institutional identifier 206b, checksum digit 208a, magnetic checksum digit 208b, MICR account number 210a, magnetic MICR account number 210b, MICR amount 212a, magnetic MICR amount 212b, MICR item number 214a and magnetic MICR item number 214b.

The data-contents of each of the segments of transaction record 200 may represent information in a section of the MICR line printed on the check. The MICR line printed on the check may include one or more printed characters or symbols represented by data-contents of a segment of transaction record 200.

Symbol 202a and/or magnetic symbol 202b may correspond to one or more MICR-string-identifying symbols printed on the check. MICR-string-identifying symbols may demarcate the beginning and/or the end of other MICR information printed on the check. In electronically reading MICR information printed in a MICR string on the check, an identity of the MICR information following and/or preceding a MICR-string-identifying symbol may be determined by the particular printed symbol. Data-contents of symbol 202a may represent information obtained from the scanned image of the MICR line. Data-contents of magnetic symbol 202b may represent information obtained from the magnetic read of the MICR line.

Routing number 204a and/or magnetic routing number 204b may correspond to a Federal Reserve routing number printed on the check in the MICR line. ABA institutional identifier 206a and/or magnetic ABA institutional identifier 206b may correspond to an ABA institutional identifier printed on the check in the MICR line. The ABA institutional identifier printed on the check in the MICR line may identify the FI maintaining the account against which the check may be written, viz., the payor FI. Data-contents of routing number 204a may represent information obtained from the scanned image of the MICR line. Data-contents of ABA institutional identifier 206a may represent information obtained from the scanned image of the MICR line. Data-contents of magnetic routing number 204b may represent information obtained from the magnetic read of the MICR line. Data-contents of magnetic ABA institutional identifier 206b may represent information obtained from the magnetic read of the MICR line.

Checksum digit 208a and/or magnetic checksum digit 208b may correspond to a check digit printed on the check in the MICR line. Data-contents of checksum digit 208a may represent information obtained from the scanned image of the MICR line. Data-contents of magnetic checksum digit 208b may represent information obtained from the magnetic read of the MICR line.

A typical RTN printed in the MICR line on a United States check may include nine consecutive digits. The first four digits may be a Federal Reserve routing number; the next four digits may be an ABA institutional identifier; and the last digit may be a check digit.

Other countries, such as Canada, may use a MICR line RTN that differs in composition and format from those of a United States MICR line RTN. A foreign MICR line RTN may contain a functional equivalent of a routing number and/or of an institutional identifier. The apparatus, methods and media of the disclosure may be applied to correction of a defective datum of a foreign MICR line RTN.

A RTN printed on the check in the MICR line may comprise the Federal Reserve routing number printed on the check in the MICR line, the ABA institutional identifier printed on the check in the MICR line, and the check digit printed on the check in the MICR line.

MICR account number 210a and/or magnetic MICR account number 210b may correspond to an account number printed on the check in the MICR line. The account number may identify the account against which the check may be written. Data-contents of MICR account number 210a may represent information obtained from the scanned image of the MICR line. Data-contents of magnetic MICR account number 210b may represent information obtained from the magnetic read of the MICR line.

MICR amount 212a and/or magnetic MICR amount 212b may correspond to a currency amount printed on the check in the MICR line. The currency amount may be the amount for which the check may be written. Data-contents of MICR amount 212a may represent information obtained from the scanned image of the MICR line. Data-contents of magnetic MICR amount 212b may represent information obtained from the magnetic read of the MICR line.

MICR item number 214a and/or magnetic MICR item number 214b may correspond to an item number printed on the check in the MICR line. The item number may identify the check itself. The item number may be a number assigned to the check to identify the check. Data-contents of MICR item number 214a may represent information obtained from the scanned image of the MICR line. Data-contents of magnetic MICR item number 214b may represent information obtained from the magnetic read of the MICR line.

The MICR line printed on the check may contain other information (not shown) not described above, including, e.g., a MICR FI branch identifier and information in an auxiliary On-Us MICR field. A transaction record may contain segments the data-contents of which may represent such other information. Data-contents of such segments may represent information obtained from the scanned image of the MICR line. Data-contents of such segments may represent information obtained from the magnetic read of the MICR line.

The processor may use a look-up table to identify a segment of magnetically read MICR line data that corresponds to the defective MICR line datum. The look-up table may show a correspondence between a segment of optically scanned MICR line data and a segment of magnetically read MICR line data. An exemplary look-up table of correspondence between optically scanned MICR line data and magnetically read MICR line data, as keyed to segments of transaction record 200, may show correspondences between: symbol 202a and magnetic symbol 202b; routing number 204a and magnetic routing number 204b; ABA institutional identifier 206a and magnetic ABA institutional identifier 206b; checksum digit 208a and magnetic checksum digit 208b; MICR account number 210a and magnetic MICR account number 210b; MICR amount 212a and magnetic MICR amount 212b; and MICR item number 214a and magnetic MICR item number 214b.

The look-up table may show other suitable correspondences between optically scanned MICR line data and magnetically read MICR line data. Such correspondences may include a correspondence between a transaction record segment of a scanned image of a MICR FI branch identifier printed on the check and a transaction record segment of a magnetic read of the same printed MICR FI branch identifier; and/or between a transaction record segment of a scanned image of any MICR line feature printed on the check and a transaction record segment of a magnetic read of the same printed MICR line feature.

FIG. 3 shows transaction record 300. Transaction record 300 may show illustrative examples of data-contents of non-MICR data 104 (also shown in FIG. 1). Transaction record 300 may include one or more segments, such as item number 301, date 302, account number 304, legal amount 306, dollar box amount 308, payor signature 310, customer name 312, customer address 314, payee 316, endorsement signature 318, fractional routing number 320, fractional institutional identifier 322, financial institution name 324, financial institution address 326, memo line note 328, logo 330, watermark 332, barcode 334, QR Code 336, front security 338 and back security 340.

The data-contents of each of the segments of transaction record 300 may represent information in a section of non-MICR data printed or written on the check. The non-MICR data printed or written on the check may include one or more printed or written characters or symbols represented by data-contents of a segment of transaction record 300. The non-MICR data printed or written on the check may be printed or written on the check in areas of the check distinct from an area of the MICR line data printed on the check.

Some non-MICR data featured on the check and represented by data-contents of some segments of transaction record 300, may be dependent on details of the transaction. Some features of the check, e.g., a transaction date or a check number, may be dependent on, and/or be keyed to, details of the transaction. Some non-MICR data printed on the check and represented by data-contents of some segments of transaction record 300, may be independent of details of the transaction. Some printed features of the check, such as a payor bank name, may be independent of, and/or be invariant with respect to, details of the transaction. In descriptions below of transaction record 300 in FIG. 3, the printing on the check of transaction-independent non-MICR data and features may be referred to as "hard". For example, a payor bank name printed on the check may be referred to as being "hard-printed."

Item number 301 may correspond to a check item number that was hard-printed on the check. The check item number hard-printed on the check may be hard-printed near the upper right corner of the check-front. The check item number may be preceded by a hard-printed phrase "Check No." or some other word or phrase indicating that the number hard-printed thereafter may be a check item number. Item number 301 may identify the check.

Date 302 may correspond to an alphanumerical check date that was printed or written on the check. The alphanumerical check date printed or written on the check may be printed or written on or about a "date line" hard-printed on the check. The date line may be preceded by a hard-printed word "Date" or some other word or phrase indicating that the number printed or written thereafter may be an alphanumerical check date. Date 302 may identify a date of check transaction. Date 302 may represent a scanned image of the alphanumerical check date. Date 302 may represent an outcome of an analysis of the check date derived from the scanned image of the alphanumerical check date. Analysis of the scanned image of the alphanumerical check date may be aided by, and/or its outcome may be compared with, verification information contained in non-check data 106 (shown in FIG. 1), such as a transaction time stamp that may be received from the POCS.

Account number 304 may correspond to an account number that was hard-printed on the check. Account number 304 may correspond to an account number indicated on the check in a barcode or a QR Code. Account number 304 may identify an FI account against which the check may be written.

Legal amount 306 may correspond to an alphanumerical currency amount that was printed or written on the check. The alphanumerical currency amount printed or written on the check may be printed or written on or about an "amount line" hard-printed on the check. The amount line may be followed or preceded by a hard-printed word "Dollars" or some other term or symbol for a national currency. The alphanumerical currency amount printed or written on the check may be printed or written as an alphabetical, not numerical, expression of an integer number of dollars (e.g., "Four hundred sixty three", not "463") followed by a numerical fractional expression of a partial number of dollars (e.g., 75/100); the currency amount printed or written on the check containing no partial number of dollars may be indicated as a numerical or alphanumerical fractional expression (e.g., "00/100" or "xx/100"). The alphanumerical currency amount printed or written on the check may indicate a currency value. Legal amount 306 may specify an amount for which the check may be written. Legal amount 306 may specify an amount to be debited from the FI account. Legal amount 306 may represent a scanned image of the alphanumerical currency amount. Legal amount 306 may represent an outcome of an analysis of the currency amount derived from the scanned image of the alphanumerical currency amount. The outcome of the analysis of the scanned image of the alphanumerical currency amount may be numerically equal to the value indicated by the alphanumerical currency amount. That value may equal, and the analysis may be checked against, and/or aided by, a numerical currency amount written or printed on the check.

Dollar box amount 308 may correspond to the numerical currency amount that was printed or written on the check. The numerical currency amount printed or written on the check may be printed or written within a "dollar box" hard-printed on the check; the dollar box may be followed or preceded by a hard-printed "$" symbol or some other symbol of a national currency. The numerical currency amount printed or written within the dollar box may be printed or written as a numerical, not alphanumerical, expression (e.g., "463.75", not "Four hundred sixty three and 75/100").

Payor signature 310 may correspond to an authorizing signature that was printed or written on the check. The authorizing signature printed or written on the check may be printed or written on or about a "signature line" hard-printed on the check. The authorizing signature printed or written on the check may indicate an authorization by a holder of the account to the FI to have the account debited by the currency amount indicated by the alphanumerical currency amount. Payor signature 310 may represent a scanned image of the authorizing signature. Payor signature 310 may represent an outcome of an analysis of accountholder identity derived from the scanned image of the authorizing signature. The analysis of the scanned image of the authorizing signature may be checked against, and/or aided by, verification information contained in non-check data 106 (shown in FIG. 1) that may be received from the payor's FI. The analysis of the scanned image of the authorizing signature may be checked against, and/or aided by, accountholder name information hard-printed on the check.

Customer name 312 may correspond to accountholder name information that was hard-printed on the check. The accountholder name information hard-printed on the check may be hard-printed near an upper left corner of the check-front. The accountholder name information hard-printed on the check may be hard-printed in an area of the check away from the upper left corner of the check-front.

Customer address 314 may correspond to accountholder address information that was hard-printed on the check. The accountholder address information hard-printed on the check may be hard-printed below, and/or in the same area of the check as, and/or away from, the accountholder name information.

Payee 316 may correspond to a designation of the payee party that was printed or written on the check. The payee party printed or written on the check may be printed or written on or about a "pay-to line" hard-printed on the check. The pay-to line may be preceded by a hard-printed phrase "Pay to the order of" or some other phrase indicating that the designation printed or written thereafter may designate the payee party. Payee 316 may represent a scanned image of the designation of the payee party. Payee 316 may represent an outcome of an analysis of payee party identity derived from the scanned image of the designation of the payee party. The analysis of the scanned image of the payee party may be used to check against a payee endorsement signature.

Endorsement signature 318 may correspond to the payee endorsement signature. The payee endorsement signature may have been printed or written on the check-back. Endorsement signature 318 may represent a scanned image of the payee endorsement signature. Endorsement signature 318 may represent an outcome of an analysis of the scanned image of the payee endorsement signature. The analysis of the scanned image of the payee endorsement signature may be checked against, and/or aided by, the analysis of the scanned image of the payee party that may be associated with payee 316. The analysis of the scanned image of the payee endorsement signature may be checked against, and/or aided by, verification information contained in non-check data 106 (shown in FIG. 1) that may be received from a database containing information associated with the payee.

Fractional routing number 320 may correspond to a non-MICR Federal Reserve routing number that was hard-printed on the check. Fractional institutional identifier 322 may correspond to a non-MICR ABA institutional identifier that was hard-printed on the check. The non-MICR Federal Reserve routing number and the non-MICR ABA institutional identifier may be hard-printed on the check as a fraction. The non-MICR Federal Reserve routing number may be hard-printed on the check as a denominator of the fraction. The non-MICR ABA institutional identifier may be hard-printed on the check as a numerator of the fraction. A slash or line may be hard-printed on the check between the numerator and denominator of the fraction printed on the check. The fraction hard-printed on the check may be preceded by one or more digits hard-printed on the check. A dash may be hard-printed on the check between the one or more digits preceding the fraction and the fraction. A typical non-MICR RTN hard-printed on the check in an area of the check that is distinct from an area of the MICR line data printed on the check may comprise the fraction. The fraction may be referred to as a fractional RTN.

The fractional RTN may be typical of a non-MICR RTN printed on a United States check. Other countries may use a non-MICR RTN that differs in composition and format from those of a United States non-MICR RTN. A foreign non-MICR RTN may contain a functional equivalent of a routing number and/or of an institutional identifier.

Financial institution name 324 may correspond to FI name information that was hard-printed on the check. The FI name information hard-printed on the check may identify the FI maintaining the account against which the check may be written, viz., the payor FI.

Financial institution address 326 may correspond to FI address information that was hard-printed on the check. The FI address information hard-printed on the check may be hard-printed below, and/or in the same area of the check as, the FI name information. The FI address information hard-printed on the check may identify an address of a branch of the FI.

Memo line note 328 may correspond to a customer notation that was printed or written on the check. The customer notation printed or written on the check may be printed or written on or about a "memo line" hard-printed on the check. The memo line may be preceded by a hard-printed word "Memo" or some other word or phrase. Memo line note 328 may represent a scanned image of the customer notation. Memo line note 328 may represent an outcome of an analysis of the scanned image of the customer notation.

Logo 330 may correspond to a logo that was hard-printed on the check. The logo hard-printed on the check may identify the FI. The logo hard-printed on the check may serve as a check security measure.

Watermark 332 may correspond to a watermark that was hard-printed on the check. The watermark may serve as a check security measure.

Barcode 334 may correspond to a barcode that was hard-printed on the check. The barcode hard-printed on the check may serve as a check security measure. Barcode 334 may represent a scanned image of the barcode printed on the check. Barcode 334 may represent an outcome of an analysis of the barcode printed on the check. The barcode hard-printed on the check may code for one or more characters. The one or more characters encoded in the barcode may be represented by data-contents of one or more other segments of transaction record 300. The barcode hard-printed on the check may, for example, code for the account number represented by data-contents of account number 304. In such an example, data-contents of account number 304 may be duplicative of data-contents of barcode 334; transaction record 300 may or may not contain both an account number 304 segment and a barcode 334 segment.

The barcode hard-printed on the check may code for one or more characters not represented by data-contents of any other segments of transaction record 300. The barcode hard-printed on the check may, for example, code for an identifying number of a branch of the payor FI.

Barcode 334 may correspond to a barcode printed on the check that is dependent on details of the transaction. The barcode printed on the check may code for one or more details of the transaction. The barcode printed on the check may, for example, code for the numerical currency amount.

QR Code 336 may correspond to a QR Code that was printed on the check. The QR Code printed on the check may be hard-printed. The QR Code printed on the check may serve as a check security measure. QR Code 336 may represent a scanned image of the QR Code printed on the check. QR Code 336 may represent an outcome of an analysis of the QR Code printed on the check. The QR Code printed on the check may code for one or more characters. The one or more characters encoded in the QR Code may be represented by data-contents of one or more other segments of transaction record 300, with similar exemplary considerations as presented immediately above in description of barcode 334.

The QR Code printed on the check may code for one or more characters not represented by data-contents of any other segments of transaction record 300. The QR Code printed on the check may, for example, code for a website address that apparatus, methods and media described herein may securely access for information. The information of the website may be stored in, may update and/or may be compared with, non-check data 106 (shown in FIG. 1).

The information of the website may be used in solicitation. The solicitation may be targeted advertising. The targeted advertising may advertise check printing; FI services offered to the payor, merchant and/or payee; payee-related matters; and/or any other suitable solicitation subjects. Other suitable solicitation subjects may include services available at the POCS.

Front security 338 and back security 340 may correspond to security symbols that were hard-printed on the check-front and the check-back, respectively. Security symbols hard-printed on the check-front and the check-back may serve as check security measures.

The processor may use a look-up table to identify a segment of non-MICR data that corresponds to the defective MICR line datum. The look-up table may show a correspondence between a MICR line data segment and one or more non-MICR data segments. For a MICR line data segment that corresponds in the look-up table to more than one non-MICR data segment, the processor may follow one or more selection algorithms to determine which non-MICR data segment to use.

As keyed to segments of transaction record 200 (shown in FIG. 2) and segments of transaction record 300, an exemplary look-up table of correspondence between MICR line data and non-MICR data, may show correspondences between: routing number 204a and fractional routing number 320; ABA institutional identifier 206a and fractional institutional identifier 322; MICR account number 210a and account number 304; MICR amount 212a and dollar box amount 308; and MICR item number 214a and item number 301.

The look-up table may show other suitable correspondences between MICR line data segments of transaction 200 (shown in FIG. 2) and non-MICR data segments of transaction 300, such as correspondences between: ABA institutional identifier 206a and financial institution name 324; ABA institutional identifier 206a and logo 330; MICR account number 210a and customer name 312; MICR account number 210a and payor signature 310.

The look-up table may also show other suitable correspondences between MICR line data and non-MICR data. Such correspondences may include correspondence between a transaction record segment of a scanned image of a MICR FI branch identifier printed on the check in the MICR line and a transaction record segment of a scanned image of a non-MICR FI branch identifier printed on the check in an area distinct from the MICR line.

FIG. 4 shows transaction record 400. Transaction record 400 may show illustrative examples of data-contents of non-check data 106 (also shown in FIG. 1). Transaction record 400 may include one or more segments such as transaction location 402, transaction time stamp 404, verification information 406, and account balance 408.

The data-contents of each of the segments of transaction record 400 may represent information that was not printed or written on the check. The data-contents of each of the segments of transaction record 400 may represent information that is not derived from information on the check. The data-contents of each of the segments of transaction record 400 may represent augmenting data. Augmenting data may be received from the POCS, the payor FI, a database containing information associated with the payee, and/or any other suitable source of information. Other suitable sources of information may include a website encoded in a QR Code printed on the check.

Transaction location 402 may correspond to transaction location information received from the POCS. The transaction location information received from the POCS may indicate the location of the check transaction.

Transaction time stamp 404 may correspond to transaction time information received from the POCS. The transaction time information received from the POCS may indicate the time of the check transaction.

Verification information 406 may correspond to transaction verification information received from the payor FI. Transaction verification information received from the payor FI may be used to authenticate the check-writer as the accountholder. For example, verification information 406 may include an analyzed accountholder signature that may be electronically compared with the data-contents of payor signature 310 (shown in FIG. 3).

Verification information 406 may correspond to transaction verification information received from a database containing information associated with the payee.

Transaction verification information may be used for other suitable comparisons, verifications and authentications. For example, verification information 406 may contain encrypted digital keys with which to utilize security symbols printed on the check.

Transaction verification information may be used to verify funds sufficiency of the accountholder's account. For example, verification information 406 may include an account balance at the time of transaction.

Transaction verification information may be used to identify a payee's account. For example, verification information 406 may include an account number of a merchant designated as the payee. The designated payee may be represented by the data-contents of payee 316 (shown in FIG. 3) and/or endorsement signature 318 (shown in FIG. 3).

Account balance 408 may correspond to the payor's account balance at the time of transaction.

Figure 5:
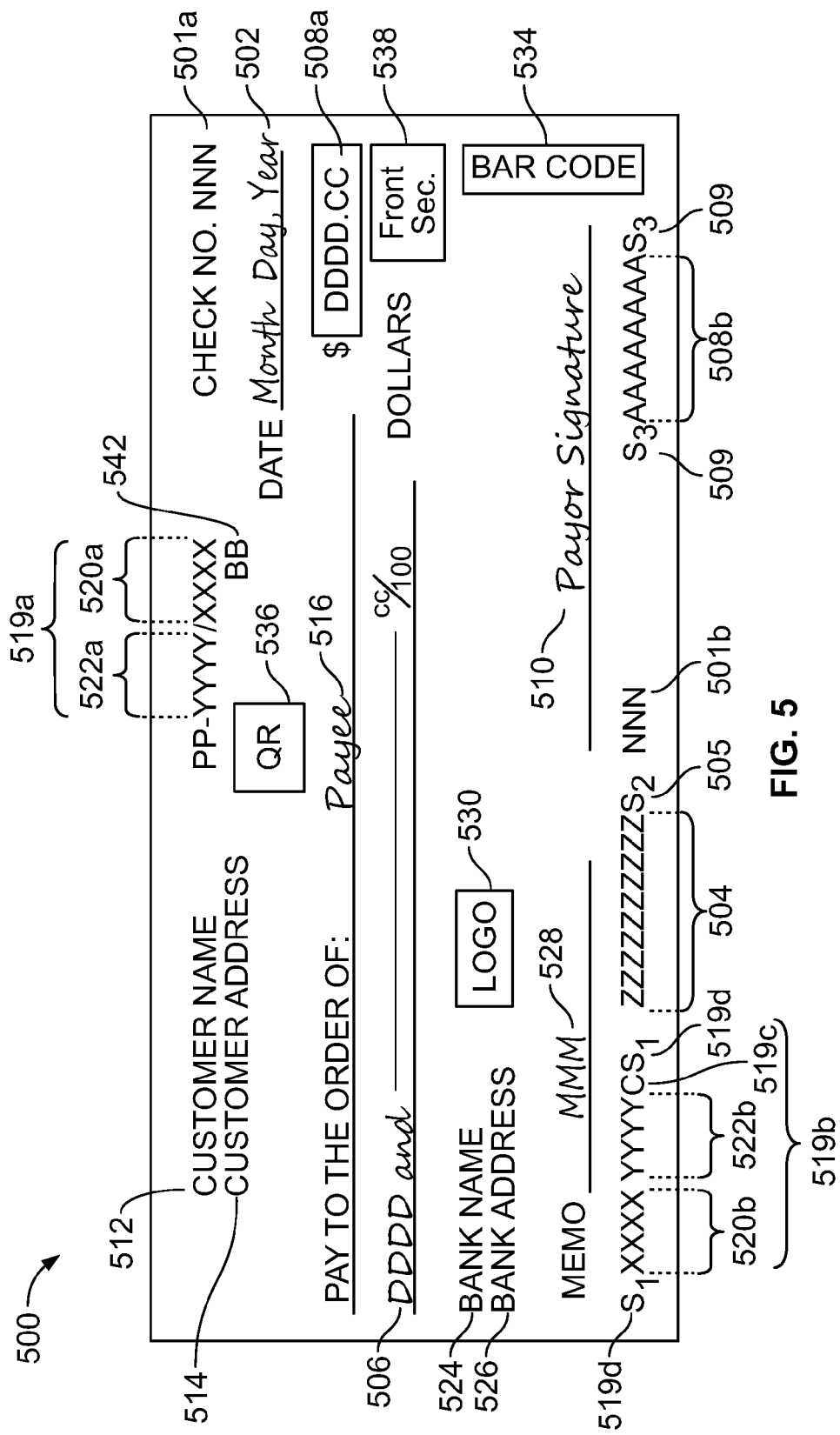
FIGS. 5-6 show illustrative sources of information that may be used in accordance with the principles of the invention.
Figure 6:
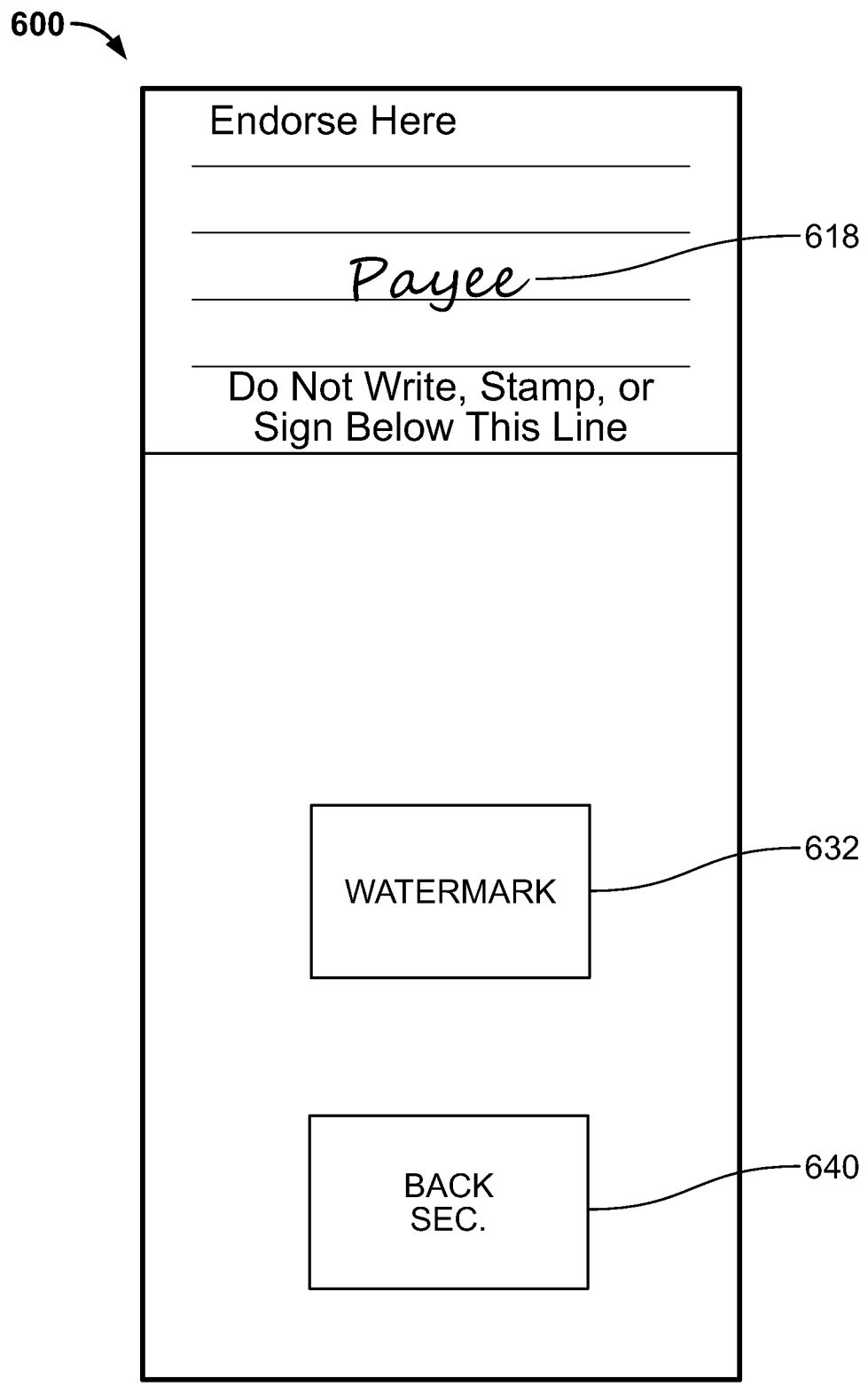

FIGS. 5 and 6 show illustrative check images 500 and 600, respectively. Check images 500 and 600 may depict illustrative features of a scanned check-front and a scanned check-back, respectively. The features depicted in check-front image 500 and check-back image 600 may represent illustrative check features printed and/or written on a front surface and a back surface, respectively, of the check. In descriptions below of check images 500 and 600, features representing print and/or writing on a check-surface may be referred to as check-surface (hereinafter, "CS") features.

A segment of transaction record 200 (shown in FIG. 2) or of transaction record 300 (shown in FIG. 3) may correspond to a CS feature. In descriptions below of CS features of check images 500 and 600, such correspondence may be noted.

FIG. 5 shows illustrative check-front image 500. Check image 500 may include one or more CS features, such as CS check item number 501a, CS MICR item number 501b, CS alphanumerical check date 502, CS MICR account number 504, CS MICR account number-field symbol 505, CS alphanumerical currency amount 506, CS numerical currency amount 508a, CS MICR amount 508b, CS MICR amount-field symbol 509, CS authorizing signature 510, CS accountholder name information 512, CS accountholder address information 514, CS payee designation 516, CS fractional RTN 519*a*, CS MICR RTN 519*b*, CS MICR checksum digit 519*c*, CS MICR RTN-field symbol 519*d*, CS fractional routing number 520*a*, CS MICR routing number 520*b*, CS fractional institutional identifier 522*a*, CS MICR institutional identifier 522*b*, CS FI name information 524, CS FI address information 526, CS customer notation 528, CS logo 530, CS barcode 534, CS QR Code 536, CS front security symbol 538 and CS FI branch identifier 542.

CS check item number 501*a* may represent the check item number printed on the check. CS check item number 501*a* may identify the check. Item number 301 (shown in FIG. 3) may correspond to CS check item number 501*a*.

CS MICR item number 501*b* may represent the check item number printed on the check in the MICR line. CS MICR item number 501*b* may identify the check. MICR item number 214*a* (shown in FIG. 2) and/or magnetic MICR item number 214*b* (shown in FIG. 2) may correspond to CS MICR check item number 501*b*.

CS alphanumerical check date 502 may represent the alphanumerical check date printed or written on the check. Date 302 (shown in FIG. 3) may correspond to CS alphanumerical check date 502.

CS MICR account number 504 may represent the account number printed on the check in the MICR line. MICR account number 210*a* (shown in FIG. 2) and/or magnetic MICR account number 210*b* (shown in FIG. 2) may correspond to CS MICR account number 504.

CS MICR account number-field symbol 505 may represent a MICR-string-identifying symbol printed on the MICR line in conjunction with CS MICR account number 504. CS MICR account number-field symbol 505 may identify CS MICR account number 504.

CS alphanumerical currency amount 506 may represent the alphanumerical currency amount printed or written on the check. Legal amount 306 (shown in FIG. 3) may correspond to CS alphanumerical currency amount 506.

CS numerical currency amount 508*a* may represent the numerical currency amount printed or written on the check. Dollar box amount 308 (shown in FIG. 3) may correspond to CS numerical currency amount 508*a*.

CS MICR amount 508*b* may represent the currency amount printed on the check in the MICR line. MICR amount 212*a* (shown in FIG. 2) and magnetic MICR amount 212*b* (shown in FIG. 2) may correspond to CS MICR amount 508*b*.

CS MICR amount-field symbol 509 may represent a MICR-string-identifying symbol printed on the MICR line in conjunction with CS MICR amount 508*b*. CS MICR amount-field symbol 509 may identify CS MICR amount 508*b*.

CS authorizing signature 510 may represent the authorizing signature printed or written on the check. Payor signature 310 (shown in FIG. 3) may correspond to an authorizing signature printed or written on the check.

CS accountholder name information 512 may represent the accountholder name information printed on the check. Customer name 312 (shown in FIG. 3) may correspond to CS accountholder name information 512.

CS accountholder address information 514 may represent the accountholder address information printed on the check. Customer address 314 (shown in FIG. 3) may correspond to CS accountholder address information 514.

CS payee designation 516 may represent the designation of the payee party printed or written on the check. Payee 316 (shown in FIG. 3) may correspond to CS payee designation 516.

CS fractional RTN 519*a* may represent the fractional RTN printed on the check.

The fractional RTN printed on the check may comprise the fractional routing number printed on the check and the fractional institutional identifier printed on the check.

CS MICR RTN 519*b* may represent the RTN printed on the check in the MICR line.

CS MICR checksum digit 519*c* may represent the check digit printed on the check in the MICR line. Checksum 208*a* (shown in FIG. 2) and magnetic checksum 208*b* (shown in FIG. 2) may correspond to CS MICR checksum digit 519*c*.

The RTN printed on the check in the MICR line may comprise the Federal Reserve routing number printed on the check in the MICR line, the ABA institutional identifier printed on the check in the MICR line, and the check digit printed on the check in the MICR line.

CS MICR RTN-field symbol 519*d* may represent a MICR-string-identifying symbol printed on the MICR line in conjunction with CS MICR RTN 519*b*. CS MICR RTN-field symbol 519*d* may identify CS MICR RTN 519*b*.

CS fractional routing number 520*a* may represent the fractional routing number printed on the check. Fractional routing number 320 (shown in FIG. 3) may correspond to CS fractional routing number 520*a*.

CS MICR routing number 520*b* may represent the Federal Reserve routing number printed on the check in the MICR line. Routing number 204*a* (shown in FIG. 2) and magnetic routing number 204*b* (shown in FIG. 2) may correspond to CS MICR routing number 520*b*.

CS fractional institutional identifier 522*a* may represent the fractional institutional identifier printed on the check. Fractional institutional identifier 322 (shown in FIG. 3) may correspond to CS fractional institutional identifier 522*a*.

CS MICR institutional identifier 522*b* may represent the ABA institutional identifier printed on the check in the MICR line. ABA institutional identifier 206*a* (shown in FIG. 2) and magnetic ABA institutional identifier 206*b* (shown in FIG. 2) may correspond to CS MICR institutional identifier 522*b*.

CS FI name information 524 may represent the FI name information printed on the check. Financial institution name 324 (shown in FIG. 3) may correspond to CS FI name information 524.

CS FI address information 526 may represent the FI address information printed on the check. Financial institution address 326 (shown in FIG. 3) may correspond to CS FI address information 526.

CS customer notation 528 may represent the customer notation printed or written on the check. Memo line note 328 (shown in FIG. 3) may correspond to CS customer notation 528.

CS logo 530 may represent the logo printed on the check. Logo 330 (shown in FIG. 3) may correspond to CS logo 530.

CS barcode 534 may represent the barcode printed on the check. Barcode 334 (shown in FIG. 3) may correspond to CS barcode 534.

CS QR Code 536 may represent the QR Code printed on the check. QR Code 336 (shown in FIG. 3) may correspond to CS QR Code 536.

CS front security symbol 538 may represent the security symbol printed on the check-front. Front security 338 (shown in FIG. 3) may correspond to CS front security symbol 538.

CS FI branch identifier 542 may represent a FI branch identification number printed on the check.

FIG. 6 shows illustrative check-back image 600. Check image 600 may include one or more CS features, such as CS payee endorsement signature 618, CS watermark 632 and CS back security symbol 638.

CS payee endorsement signature 618 may represent the payee endorsement signature printed or written on the check-back. Endorsement signature 318 (shown in FIG. 3) may correspond to CS payee endorsement signature 618.

CS watermark 632 may represent the watermark printed on the check. Watermark 332 (shown in FIG. 3) may correspond to CS watermark 632.

CS back security symbol 640 may represent the security symbol printed on the check-back. Back security 340 (shown in FIG. 3) may correspond to CS back security symbol 640.

Figure 7:
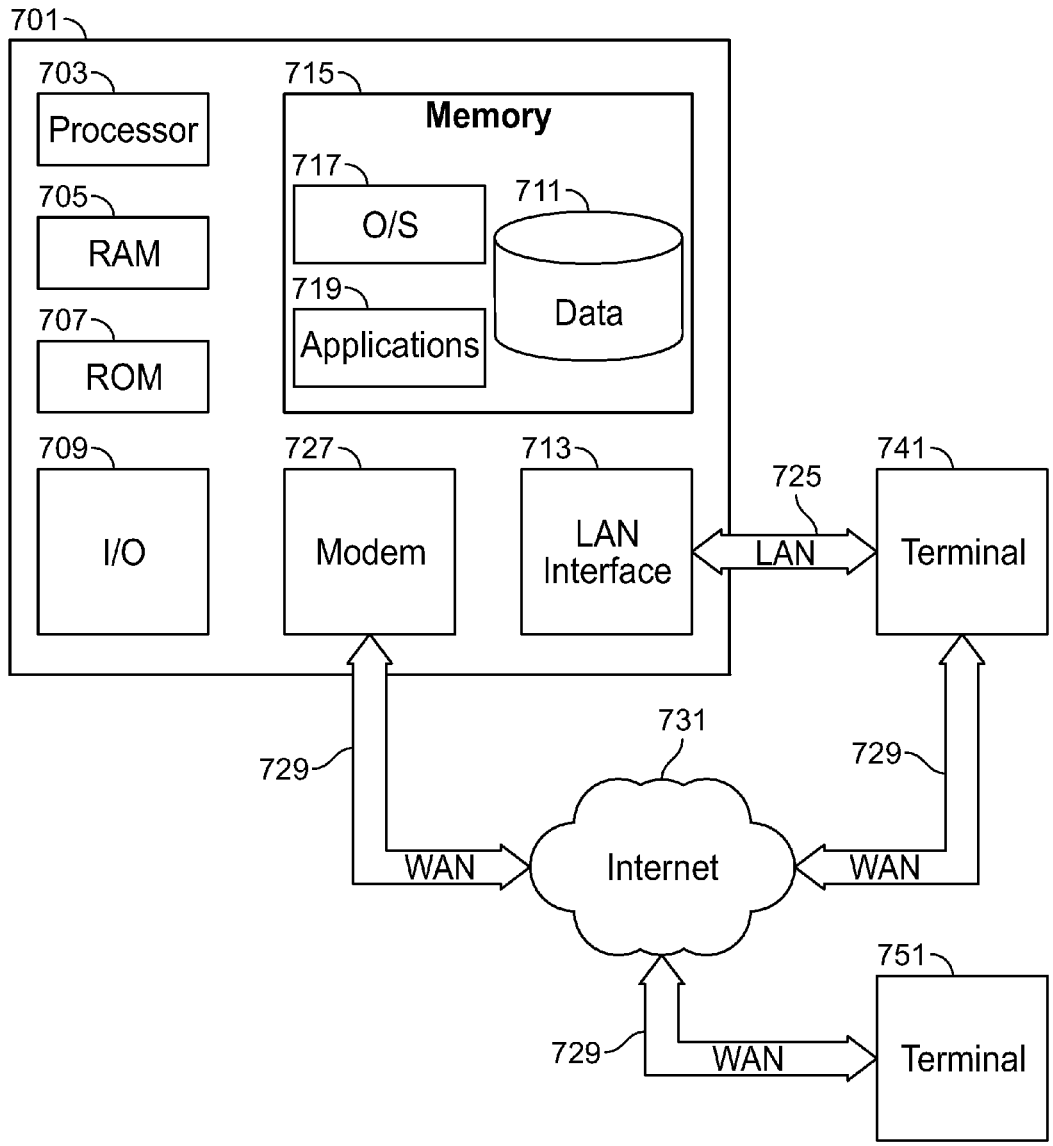
FIG. 7 shows illustrative apparatus that may be used in accordance with the principles of the invention.

FIG. 7 is a block diagram that illustrates a generic computing device 701 (alternatively referred to herein as a "server") that may be used in accordance with the principles of the invention. Server 701 may be included in any suitable apparatus that is shown or described herein. Server 701 may have a processor 703 for controlling overall operation of the server and its associated components, including RAM 705, ROM 707, input/output ("I/O") module 709, and memory 715.

I/O module 709 may include a microphone, keypad, touch screen, fingerprint reader, biometric scanner, camera and/or stylus through which a user of device 701 may provide input, and may also include one or more of a speaker for providing audio output and a video display device for providing textual, audiovisual and/or graphical output. Software may be stored within memory 715 and/or storage to provide instructions to processor 703 for enabling server 701 to perform various functions. For example, memory 715 may store software used by server 701, such as an operating system 717, application programs 719, and an associated database 711. Alternatively, some or all of server 701 computer executable instructions may be embodied in hardware or firmware (not shown).

Database 711 may store transaction records; FI account information; look-up tables of correspondence between optically scanned MICR line data and magnetically read MICR line data; look-up tables of correspondences between MICR line data and non-MICR data; and any other information related to operation of the apparatus, methods and media of the invention.

Server 701 may operate in a networked environment supporting connections to one or more remote computers, such as terminals 741 and 751. Terminals 741 and 751 may be personal computers or servers that include some or all of the elements described above relative to server 701. The network connections depicted FIG. 7 include a local area network (LAN) 725 and a wide area network (WAN) 729, but may also include other networks. When used in a LAN networking environment, computer 701 is connected to LAN 725 through a network interface or adapter 713. When used in a WAN networking environment, server 701 may include a modem 727 or other means for establishing communications over WAN 729, such as Internet 731. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 719, which may be used by server 701, may include computer executable instructions for invoking user functionality related to communication, such as email, short message service (SMS), and voice input and speech recognition applications.

Computing device 701 and/or terminals 741 or 751 may also be mobile terminals including various other components, such as a battery, speaker, and antennas (not shown).

Terminal 751 and/or terminal 741 may be portable devices such as a laptop, tablet, cell phone, Blackberry™, or any other suitable device for storing, transmitting and/or transporting relevant information.

Any information described above in connection with database 711, and any other suitable information, may be stored in memory 715.

One or more of applications 719 may include one or more algorithms that may be used to produce electronic representations of MICR line data; produce electronic representations of check images; receive and store transaction records; enhance transaction records; identify defective check processing data; use look-up tables of data correspondences; and/or perform any other suitable tasks related to correction of check processing defects.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 8:
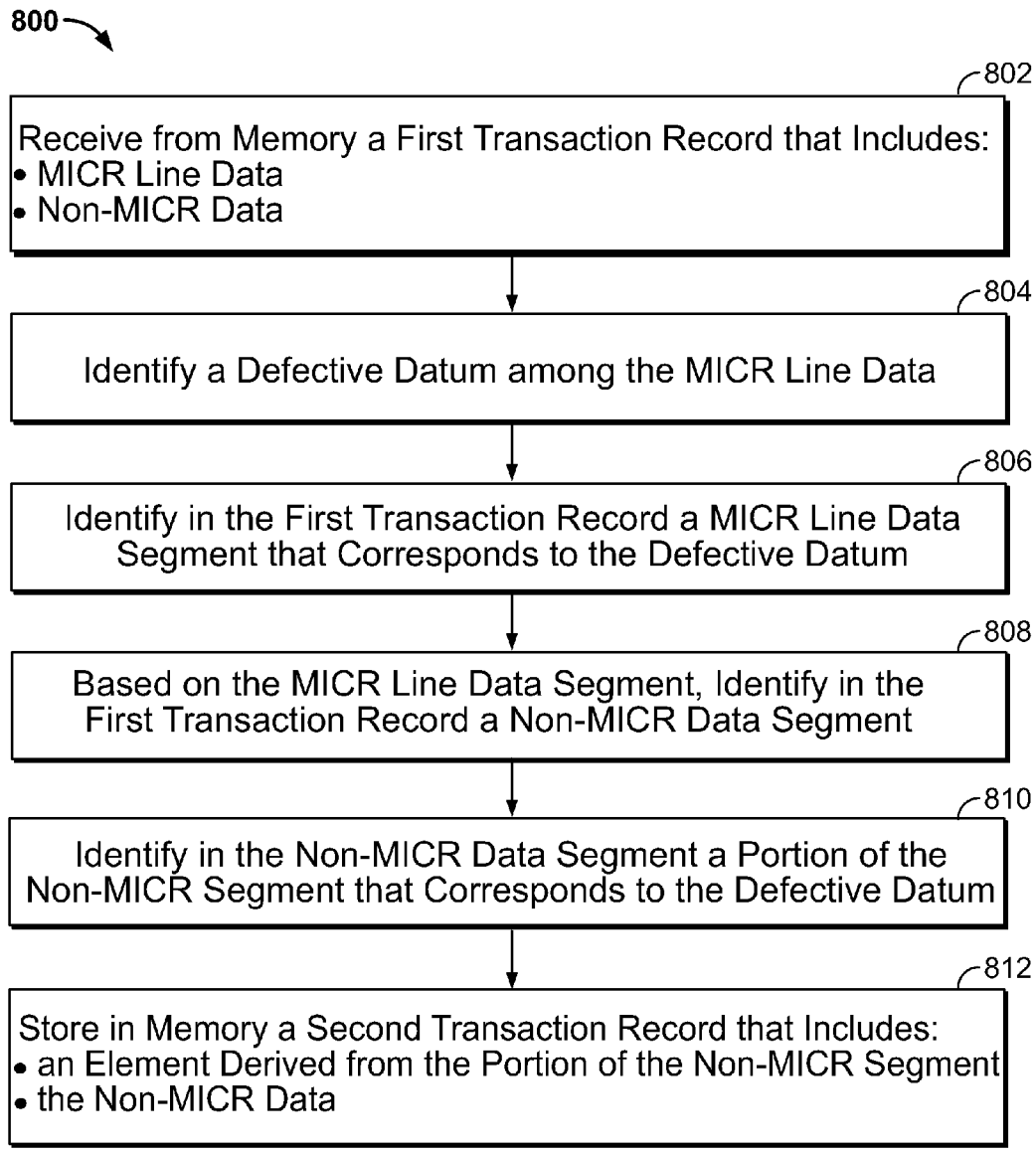
FIG. 8 shows illustrative elements of a process in accordance with the principles of the invention.

Processes in accordance with the principles of the invention may include one or more features of the processes illustrated FIG. 8. For the sake of illustration, steps of the illustrated processes will be described as being performed by a "system." The system may include one or more of the features of the apparatus shown in FIG. 7 and/or of any other suitable device or approach. The system may be provided by the functions of the invention or by any other suitable individual, organization or entity.

FIG. 8 shows illustrative process 800 for providing correction of check processing defects in accordance with the principles of the invention.

The order of performance and/or description of steps of the processes FIG. 8 is illustrative only. Each of the described steps need not be completed in the illustrated order or at all.

At step 802, the system may receive from memory a first transaction record that includes MICR line data and non-MCR data.

At step 804, the system may identify a defective datum among the MICR line data.

At step 806, the system may identify in the first transaction record a MICR line data segment that corresponds to the defective datum.

At step 808, based on the identified MICR line data segment, the system may identify in the first transaction record a non-MICR data segment.

At step 810, the system may identify in the identified non-MICR data segment a portion of the non-MICR segment that corresponds to the defective datum.

At step 812, the system may store in memory a second transaction record that includes an element derived from the identified portion of the non-MICR segment. The second transaction record may include corrected data. The corrected data may be identical to the data of the first transaction record, except for a replacement of the defective datum by the element derived from the portion of the non-MICR segment.

The corrected data of the second transaction record of step 812 may be used in processing of the check. The corrected data may be used to correct the check: the corrected check may be subject to normal check processing.

Thus, apparatus, methods and media for providing correction of check processing defects according to the invention have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. Apparatus for correcting a defective check processing datum, the apparatus comprising:
    a receiver device that is configured to receive from memory a first transaction record that includes:
        Magnetic Ink Character Recognition (MICR) line data electronically optically scanned from a check; and
        MICR line data electronically magnetically read from the check; and
    a processor device that is configured to:
        identify a defective datum among the optically scanned MICR line data;
        identify a portion of the magnetically read MICR line data that corresponds to the defective datum; and
        store in memory a second transaction record that eludes an element derived from the portion of the magnetically read MICR line data.

2. The apparatus of claim 1 wherein the processor device is further configured to store the magnetically read MICR line data in the second transaction record.

3. The apparatus of claim 1 wherein the processor device is further configured to store corrected MICR line data in the second transaction record, the corrected MICR line data being identical to the optically scanned MICR line data of the first transaction record, except for a replacement of the defective datum by the element.

4. The apparatus of claim 1 wherein the processor device is further configured to:
    identify in the first transaction record an optically scanned MICR line data segment that corresponds to the defective datum;
    based on the optically scanned MICR line data segment, identify in the first transaction record a magnetically read MICR line data segment; and
    identify, within the magnetically read MICR line data segment, the portion of the magnetically read MICR line data that corresponds to the defective datum.

* * * * *